April 7, 1942.   W. S. PRAEG   2,278,737
ROTARY FINISHING CUTTER
Filed Aug. 14, 1939   2 Sheets-Sheet 1

INVENTOR.
WALTER S. PRAEG
BY Whittemore, Hulbert & Belknap
ATTORNEYS

April 7, 1942. W. S. PRAEG 2,278,737
ROTARY FINISHING CUTTER
Filed Aug. 14, 1939 2 Sheets-Sheet 2
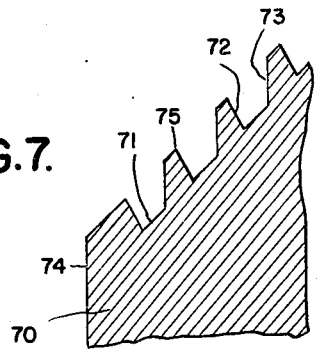
FIG.7.
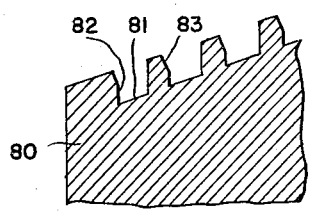
FIG.8.
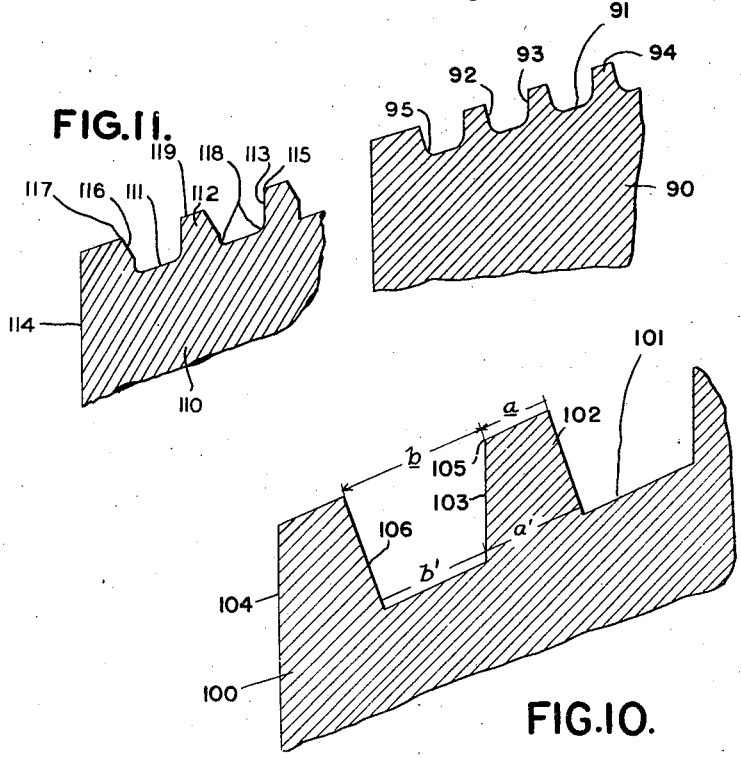
FIG.9.
FIG.11.
FIG.10.
INVENTOR.
WALTER S. PRAEG
BY
Whittemore, Hulbert & Belknap
ATTORNEYS Patented Apr. 7, 1942

2,278,737

UNITED STATES PATENT OFFICE 2,278,737

ROTARY FINISHING CUTTER

Walter S. Praeg, Detroit, Mich., assignor to National Broach & Machine Company, Detroit, Mich., a corporation of Michigan Application August 14, 1939, Serial No. 290,062

12 Claims. (Cl. 29—103)

The present invention relates to a rotary finishing cutter, and more particularly to a tool for finishing the teeth of gears.

The present invention is a continuation in part of my prior co-pending application, Serial Number 141,815, May 10, 1937, entitled "Rotary finishing cutters."

Briefly described, the invention relates to a tool employed for finishing the surface of gear teeth. The tool is in the form of a gear conjugate to the work gear, but having its teeth arranged at such a helix angle that the tool and work gear will mesh with their axes crossed by a limited angle, preferably less than 30°.

A tool of this general type is described in prior patent of Robert S. Drummond 2,126,178, and is characterized generally by the provision of a plurality of grooves running substantially straight up and down the faces of the teeth. These grooves provide cutting edges which are adapted to remove metal from the face of the gear teeth. As set forth more particularly in the prior patent referred to, cutting action is induced primarily by relative slippage between the gear teeth and the tool teeth lengthwise of the engaged teeth.

It has been the prior practice to provide the grooves referred to with the side faces of the grooves occupying planes parallel to the side faces of the tool length. In the event that the tool is in the form of a spur gear, this results, as will be evident, in the formation of right-angular cutting edges. In the event, however, that the tool is in the form of a helical gear, provision of slots or grooves as aforementioned results in the formation of cutting edges at opposite sides thereof, which are respectively acute and obtuse. In general, the cutting edges thus formed vary from a right angle by substantially the amount of the helix angle of the tool.

According to the present invention, serrations are provided in a different arrangement for the accomplishment of a number of advantageous results.

In the first place, it has been found that where the cutting edge at the outer corners of the ribs intermediate the grooves on the faces of the tool teeth is acute, there is a tendency for this acute edge to crumble away or break in use. Secondly, it has been found that the cutting action is improved where no acute cutting edge is provided.

It has further been found that by making the grooves substantially wider than in prior practice, the cutting action may be accomplished in an entirely different manner, at substantially reduced pressures with the result that increased speed of production is possible, accompanied in many cases by an actual increase in accuracy of the finished product. This increased cutting action, which is permitted by the use of relatively wide grooves, results necessarily in the formation of larger chips, and it is found desirable to modify the prior conventional groove formation to accommodate the larger chip formation.

It may be mentioned at this time that the cutting operation, as accomplished by tools of this general character, is carried on in a stream of cutting oil, and preferably this cutting oil is directed at the engaged gear and tool in a manner so that chips are washed inwardly of the tool. At the roots of the teeth of the tool an enlarged channel is provided, through which the oil flows readily and which carries the chips formed away from the cutting zone.

I have found that where relatively widely spaced lands are employed and where the chips are thus of larger size than heretofore conventional, it is very desirable to provide serrations or grooves which taper inwardly, or, in other words, grooves which flare outwardly from the bottom. It should be mentioned at this time that preferably the grooves are of uniform cross section from the root of the tool teeth to the top of the tool teeth, and the flare or taper referred to appears in the cross section of the grooves.

From the foregoing, it will be apparent that the proper design of tapered grooves results in a twofold purpose. Not only does the proper design of tapered serrations reduce the acuteness of the angle formed by a cutting edge, but it also facilitates chip removal.

With the foregoing general remarks in view, it is accordingly an object of the present invention to provide a gear cutter of the type described, characterized by the provision of unusually wide grooves.

It is a further object of the present invention to provide a gear cutter of the type described, characterized by the provision of inwardly tapered grooves.

It is a further object of the invention to provide a gear cutter of the type described, characterized by the provision of grooves having their side walls inclined such that the side walls of the grooves intersect the tooth surfaces in angles of reduced acuteness.

It is a further object of the invention to provide a gear cutter of the type described, characterized by the provision of grooves having side walls of the grooves chamfered to reduce the acuteness of the cutting edge.

It is a further object of the invention to provide a gear cutter of the type described, characterized by the provision of grooves having side walls which taper inwardly of the tooth and which are rounded at their corners to reinforce the lands intermediate the grooves and at the same time to preserve the same effective chip clearance.

Other objects of the invention will be apparent as the description proceeds, and when taken in conjunction with the accompanying drawings, wherein.

Figure 2:
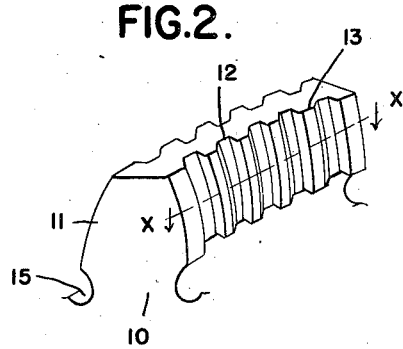
Figure 2 is a fragmentary perspective of a cutter showing a single tooth on an enlarged scale.

Figures 3 to 9, inclusive, are fragmentary sections of modified forms of cutter teeth illustrating my invention, and corresponding to a section taken on the line $x$—$x$ of Figure 2; and Figure 10 is a view similar to Figures 3 to 9 on a much enlarged scale, showing the relationship of parts.

Figure 11 is a view similar to Figures 3–9, showing a further modified form of cutter.

Figure 1:
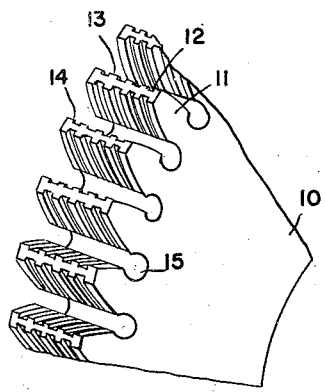
Figure 1 is a fragmentary perspective of a portion of a cutter of the type referred to herein.

Referring first to Figure 1, the cutter is indicated generally at 10, and is in the form of a gear having involute teeth 11. The teeth 11 are provided with a plurality of grooves 12 which provide intermediate ribs having surfaces or lands 13 and cutting edges indicated at 14. In addition, enlarged smooth walled channels 15 are provided at the roots of the teeth for the purpose of providing a passage for the carrying away of chips formed in the gear finishing operation.

I have shown in Figure 2 a tooth 11 of the cutter on a much enlarged scale, which is provided with grooves 12 and lands 13. I have illustrated the tooth in this figure as embodying the several features of my invention, but these will be described in connection with subsequent figures of the drawings. In Figure 2, however, attention is directed to the section line $x$—$x$.

Figures 3 to 10 are fragmentary sections on the line $x$—$x$ showing only a single corner of a tool tooth, being well adapted to illustrate the cross sectional shape of the grooves, previously referred to.

Figure 3:
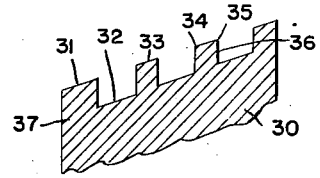

Referring to Figure 3, the gear tooth indicated at 30 has a side surface 31, interrupted by grooves 32, which in turn provide intermediate lands 33. Each of the lands presents a pair of sharp cutting edges 34 and 35 at the intersection between the side walls 36 of the grooves and the surface of the tooth.

The tooth illustrated in this figure is formed as a helical tooth. As previously stated, it has been conventional prior practice to form the side walls 36 of the grooves so that they occupy planes parallel to the flat end walls 37 of the tool blank. This results in the formation of cutting edges 34 and 35, which are respectively obtuse and acute. In Figure 3 I have illustrated primarily the relative spacing or dimensions of the grooves relative to the lands 33. As will be noted in this figure, the grooves are substantially wider than the lands.

In the past it has been conventional practice to make the grooves and lands of substantially uniform width, although in the prior Drummond patent referred to above there is an indefinite suggestion that to perform a roughing operation it may be possible to provide relatively wider grooves. I have found, however, that the provision of wider grooves, and specifically the provision of grooves of at least a minimum width, which will be specified later, provides a cutter which operates entirely differently. Furthermore, this type of cutter is not to be regarded as a roughing cutter, since it is found that the character of the work produced is in many cases superior to that resulting from the use of former conventional cutters. I have found that excellent results may be obtained when the width of the serration is at least forty per cent greater than the width of the intervening lands. In cases where tapered serrations or grooves are employed, as will be subsequently described, preferably the initial width of groove prior to regrinding of the cutter is at least twice the width of the intervening lands. By way of a specific example, a cutter having the following dimensions is found to give unexpectedly excellent results. The lands were about .025 inch in width at the top and were formed with a taper such that when reground to final depth their width was about .035 inch. The grooves intermediate the lands on the other hand had an initial width before regrinding of between .050 and .070 inch. The groove, of course, upon regrinding was reduced in width by the amount of increase in the width of the land so that the ultimate width was between .040 and .060 inch.

The use of the relatively wide serrations has several important advantages. In the first place there are fewer lands in contact with the tooth surface, and as a result there is less burnishing action. Secondly, and also as a result of the decreased land area in contact with the tooth surface, less pressure is required and therefore there is less spring of the machine per pound of material removed. This of course results in increased accuracy.

While cutters made according to the invention herein are capable of general use in gear finishing, they find their greatest utility under certain conditions.

Where the gear being cut has a small number of teeth and, hence the carry over is small, high pressures between tool and gear tend to result in gouging of the gear teeth profile, causing irregular shapes. According to the present invention, pressures are substantially reduced and results are correspondingly improved.

Much the same is true where gears of relatively high pressure angles are finished. Here, due to the wedge-like condition when the cutter teeth are forced between the gear teeth, irregularities result which may be avoided by using cutters as disclosed herein.

Finally, many gears are constructed with small bore sizes, so that the gear supporting arbor may not be of sufficient rigidity to withstand without deflection the pressures inherent in the shaving operation employing prior known cutters. It has been found that serious errors were introduced in such circumstances, particularly when the cutters became slightly dulled. Cutters made accordingly to the present invention cut freely and accurately with substantially reduced pressures, and avoid this difficulty.

When employing the wide gashes or grooves, the rate of cross feed of the tool relative to the gear is reduced, while the depth of cut is substantially increased. This results in the formation of an entirely different type of chip, and further of a chip which is considerably larger than the chip produced by the prior conventional practice. The increased width of groove accommodates the larger chips and the more rapid formation of chips which results from the increased production possible by this type of cutter.

As previously stated, the rate of cross feed is reduced but the depth of cut is substantially increased. It has been found, for example, that a tool of this type cuts so freely that it is possible to remove metal much more rapidly than by prior practice. In one instance .020 inch over pins was removed, using four strokes or less.

From the foregoing, it will be seen that two important cooperating results follow the use of relatively wide grooves. In the first place the feed will be changed so as to obtain much larger chips, and at the same time the increased burden on chip disposal is taken care of by the increased width of grooves.

Figure 4:
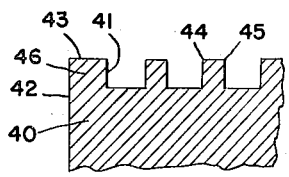

Referring now to Figure 4, I have illustrated a fragmentary section showing a corner of a spur type cutter tooth 40. In this type of cutter, as will be noted, according to the prior practice, the side walls 41 of the grooves 40 are parallel to the end faces 42 of the gear blank and intersect the tooth surface 43 so as to form right angle cutting edges 44 and 45. In this figure I have illustrated again the unusually wide spacing of the lands which results from the provision of extraordinarily wide grooves 40. Attention is also directed in this figure to the end land 46, which is of substantially greater width than intermediate lands. This is for the reason that in certain operations the end land is subjected to a substantially greater stress than the intermediate lands and is accordingly made stronger.

Figure 5:
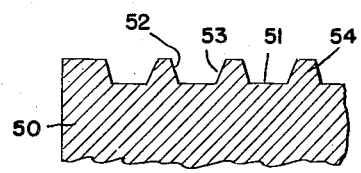

In Figure 5 I have illustrated a preferred formation of a spur type cutter 50, in which the grooves 51 are not only substantially wider than has been customary but also the side walls 52 and 53 of the grooves are tapered so as to converge inwardly of the tooth body. As a result, the cutting edges formed at the upper corners of the lands 54 are both obtuse, and chip disposal is facilitated.

It will be appreciated that the cutter as illustrated in Figure 5 differs from that shown in Figure 4 only by the substitution of the tapered side walls 52 and 53 for the parallel side walls shown in Figure 4.

Figure 6:
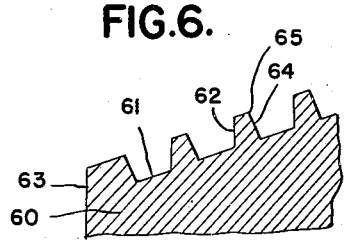

In Figure 6 I have illustrated a portion of a helical cutter tooth 60, in which the grooves 61 are again illustrated as of unusual width. In this type of cutter, as will be recalled, and as illustrated in Figure 3, the provision of the grooves with side walls parallel to the end faces of the tool blank normally results in the formation of acute and obtuse cutting edges, respectively.

In Figure 6 I have shown an arrangement in which the formation of an undesirable acute cutting angle is avoided. The side walls 62 of the grooves are unmodified and are parallel to the end faces 63 of the tool blank. The opposite side wall 64, however, is modified and is tapered as illustrated to provide a cutting edge 65 which is substantially a right angle.

As will be recalled, the provision of serrations having their side walls parallel to the end faces of the tool blank, where helical teeth are employed, results in the formation of cutting edges which differ from a right angle by substantially plus or minus the helix angle of the tool. Therefore, in order to form right angle cutting edges 65, it will be evident that the side wall 64, which is tapered, is inclined to the surface 63 at an angle substantially equal to the helix angle of the cutter.

While it was mentioned that it is often desirable to form a cutting edge as substantially a right angle, it is not always possible to do so, nor in all cases is it desirable.

In Figure 7 I have illustrated a fragment of a cutter tooth 70. This tooth is illustrated as of a relatively high helix angle. The grooves 71 have side walls 72 and 73. The side wall 73 is in a plane parallel to the end surface of the gear blank 74, and the side wall 72 is inclined as illustrated in the figure. Where a high helix angle cutter is employed, if the side wall 72 were inclined at an angle sufficiently great to produce a right-angled cutting edge at 75, the grooves would be excessively tapered. Under these circumstances, therefore, the side wall 72 is inclined at an angle which will reduce the acuteness of the cutting edge 75, although it will not result in the formation of an obtuse or a right-angled cutting edge. It is understood, of course, that in this tool also the grooves 71 are intended to be of substantially greater width than has been known to the prior practice.

Referring now to Figure 8, I show a corner fragment of a cutter tooth 80, which is shown as being the tooth of a helically formed cutter. In this modification, instead of providing the grooves 81 with side walls which taper inwardly from top to bottom, I modify only the upper portion of one side wall. Specifically the grooves 81 have side walls 82 which are chamfered, as indicated at 83. This chamfer, as will be evident from an inspection of the figure, substantially increases the effective width of the groove and at the same time reduces the acuteness of the cutting edge which would otherwise be formed. In this embodiment also, preferably the grooves are substantially wider than the lands, as specifically set forth above.

Another embodiment of my invention is illustrated in Figure 9, in which a corner section of a cutter tooth 90 is illustrated. The tooth is shown as having serrations or grooves 91, which in turn have side walls 92 and 93. As shown in this figure and as described in connection with Figures 6 to 8, the side walls of the grooves 91 which would, according to the prior practice, intersect the tooth surface to form an acute cutting edge are modified so as to form a right angle or at least to form an angle of reduced acuteness. In order to reinforce the lands 94 against side thrust, I find that it is desirable to provide rounded corners 95 at the bottom of the grooves. These rounded corners result in substantially reinforcing the lands 94 against side thrust and at the same time preserve the same effective depth of groove for oil clearance, chip clearance, and for regrinding.

In the foregoing I have described the complete embodiments of my invention, but I desire it to be understood that while I consider that there is a new and novel cooperation between the unusually wide grooves and the tapered side walls, I also consider these two features as independently new and useful.

Referring to Figure 10, I have shown on a much enlarged scale a fragmentary section of a cutter tooth illustrating the dimensions referred to. In this figure I have designated the tooth as 100, the groove as 101, and the intermediate lands as 102. As will be evident, the groove 101 has a side wall 103 which is parallel to the end face 104 of the tool blank, and which in turn intersects the surface of the tooth to form an angle 105 which is obtuse. The groove 101 is further provided with a side wall 106 which is inclined both to the opposite side wall 103 of the groove and to the end surface 104 of the tool blank, so as to intersect the tooth surface to form the angle indicated at 106, which is shown as somewhat less than a right angle but of considerably reduced acuteness.

The dimension $a$ indicates the initial width of the land when the tool is in new condition, before regrinding, and the dimension $b$ indicates the initial width of groove. Preferably the dimension $a$ is on the order of about .025 inch when the cutter is in new condition, and correspondingly the dimension $b$ is normally between .050 and .070 inch. As will be evident, as the cutter is resharpened in use, the land increases in width at the expense of the groove, and the dimension $a'$ indicates the final or ultimate width of the land. In like manner the dimension $b'$ indicates the width of the groove when the cutter has been finally reground. The dimension $a'$ is preferably on the order of about .035 inch, and correspondingly the dimension $b'$ would be decreased to from .040 to .060 inch.

In Figure 11 I have shown a somewhat modified form of cutter which embodies features illustrated separately in Figures 8 and 9. In this figure a fragment of a cutter tooth 110 is shown as provided with relatively wide grooves 111 forming intermediate ribs 112. The tooth 110, as illustrated, is a helical tooth, and the grooves 111 have side walls 113 which are parallel to the end faces of the teeth 114 and which intersect the tooth surfaces in obtuse angles forming cutting edges 115. It will be appreciated that if the side walls of the grooves 111, opposite to the side walls 113, were parallel to the side walls 113, they would intersect the tooth surface to form acute angles, which is undesirable. According to this modification of my improved tool, the side walls of the grooves 111 opposite to the grooves 113 are chamfered as indicated at 116 so as to intersect the tooth surface to form cutting edges 117. As illustrated in the figure, cutting edges 117 include an obtuse angle therebetween, but it will be appreciated that the angle might be a right angle or an angle of reduced acuteness with respect to the angle which would be formed by an unchamfered surface.

In addition the ribs 112 are reinforced by providing rounded fillets 118 at the roots of the ribs 112. The top surface of the ribs 112, as indicated at 119, are unrelieved lands which provide for the necessary guiding action.

It will be observed that in all modifications the grooves which are formed at the tooth surfaces have side walls which are straight in cross section for at least a substantial distance from the cutting edges. It will be understood that the grooves formed in all modifications serve the additional function of providing channels for the flow of oil and chips. It is contemplated that the tool may be resharpened a number of times, thus reducing the depth of the groove and correspondingly reducing the height of the ribs. By forming the grooves so that in cross section they are provided with straight sides extending for a substantial distance from the cutting edge, the angularity of the cutting edges provided will not be altered by resharpening.

As previously set forth, the provision of unusually wide grooves permits a more rapid cutting operation and results in the formation of more and larger chips. The provision of inclined serrations, as specifically described and illustrated, results in a tool which is better adapted to stand up, inasmuch as the acute angle cutting edge is reduced in acuteness. Further, the use of tapered serrations, whether or not they are designed to reduce the acuteness of a cutting edge, facilitate chip disposal during the operation. Thus, for example, in Figure 5 the grooves or serrations are shown as provided with tapered walls, although parallel side walls of the grooves would result in right angle cutting edges.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A gear cutting tool in the form of a gear-like member having helical teeth conjugate to the teeth of the gear to be cut, the faces of said tool teeth having alternate ribs and grooves extending generally straight up the tooth face, said grooves having side walls on one side thereof which occupy a plane substantially parallel to the sides of said tool, and which intersect the faces of said tool teeth to form obtuse angles, the side walls of said grooves on the opposite side thereof being inclined with respect to the first named side walls to provide inwardly narrowing grooves.

2. A gear cutting tool in the form of a gear-like member having helical teeth conjugate to the teeth of the gear to be cut, the faces of said tool teeth having alternate ribs and grooves extending generally straight up the tooth face, said grooves having side walls on one side thereof which occupy a plane substantially parallel to the sides of said tool, and which intersect the faces of said tool teeth to form obtuse angles, the side walls of said grooves on the opposite side thereof being inclined with respect to the first named side walls to provide inwardly narrowing grooves, said grooves averaging about twice the width of said ribs.

3. A gear cutting tool in the form of a gear-like member having helical teeth conjugate to the teeth of the gear to be cut, the faces of said tool teeth having alternate ribs and grooves extending generally straight up the tooth face, said grooves having side walls on one side thereof which occupy a plane substantially parallel to the sides of said tool, and which intersect the faces of said tool teeth to form obtuse angles, the side walls of said grooves on the opposite side thereof being inclined with respect to the first named side walls to provide inwardly narrowing grooves, said grooves being of a width at the top at least twice the width of said ribs at the top.

4. A gear cutting tool in the form of a helical gear having teeth conjugate to the teeth of a gear to be finished, gashes formed in the profile of said teeth providing alternate ribs and grooves of a predetermined depth, said ribs having cutting edges at their tops, and providing guiding surfaces adjacent said cutting edges, said grooves having parallel side walls intersecting the profile of said teeth in an acute and obtuse angle respectively, the wall forming an acute angle being chamfered to a substantial depth, at an angle which defines substantially a right angle with the tooth profile.

5. A gear cutting tool in the form of a helical gear having teeth conjugate to the teeth of a gear to be finished, gashes formed in the profile of said teeth providing alternate ribs and grooves of a predetermined depth, said ribs having cutting edges at their tops, and providing guiding surfaces adjacent said cutting edges, said grooves having concave bottoms, reinforcing the lands against side thrust, while preserving at least the same effective depth for oil and chip clearance, said grooves having parallel side walls intersecting the profile of said teeth in an acute and obtuse angle respectively, the wall forming an acute angle being chamfered to a substantial depth, at an angle which defines substantially a right angle with the tooth profile.

6. A gear cutting tool in the form of a helical gear having teeth conjugate to the teeth of a gear to be finished, gashes formed in the profile of said teeth providing alternate ribs and grooves of a predetermined depth, said ribs having cutting edges at their tops, and providing guiding surfaces adjacent said cutting edges, said grooves having parallel side walls intersecting the profile of said teeth in an acute and obtuse angle respectively, the wall forming an acute angle being chamfered to a substantial depth, to reduce the acuteness of said angle.

7. A gear cutting tool in the form of a helical gear having teeth conjugate to the teeth of a gear to be finished, gashes formed in the profile of said teeth providing alternate ribs and grooves of a predetermined depth, said ribs having cutting edges at their tops, and providing guiding surfaces adjacent said cutting edges, said grooves having parallel side walls intersecting the profile of said teeth in an acute and obtuse angle respectively, the wall forming an acute angle being chamfered to a substantial depth, to reduce the acuteness of said angle, said grooves averaging about twice the width of said ribs.

8. A gear cutting tool in the form of a gearlike member having helical teeth conjugate to the teeth of the gear to be cut, the faces of said tool teeth having alternate ribs and grooves extending generally straight up the tooth face, said grooves having side walls on one side thereof which occupy a plane substantially parallel to the sides of said tool, and which intersect the faces of said tool teeth to form obtuse angles, the side walls of said grooves on the opposite side thereof being inclined with respect to the first named side walls to provide inwardly narrowing grooves, said grooves having concavely rounded bottoms to reinforce the ribs against side thrust while preserving the same effective depth.

9. A gear cutting tool in the form of a gearlike member having helical teeth conjugate at crossed axes to the teeth of a gear to be cut, the teeth of said tool having grooves extending generally up and down the faces of said teeth, said grooves providing intermediate ribs, said ribs having top land surfaces which are conjugate to the teeth of the gear to be cut and which serve as guiding surfaces, said grooves having a cross section perpendicular to their length in which straight sides intersect the faces of the teeth to provide cutting edges at the corners of said ribs, one of said straight sides of said grooves being substantially parallel to the side of said tool and forming an obtuse angled cutting edge with the adjacent land surface, the opposite one of said straight sides diverging outwardly of said groove from the first mentioned side of said groove to provide a cutting edge with the adjacent land surface of reduced acuteness.

10. A gear cutting tool in the form of a gearlike member having helical teeth conjugate at crossed axes to the teeth of a gear to be cut, the teeth of said tool having grooves extending generally up and down the faces of said teeth, said grooves providing intermediate ribs, said ribs having top land surfaces which are conjugate to the teeth of the gear to be cut and which serve as guiding surfaces, said grooves having a cross section perpendicular to their length in which straight sides intersect the faces of the teeth to provide cutting edges at the corners of said ribs, one of said straight sides of said grooves being substantially parallel to the side of said tool and forming an obtuse angled cutting edge with the adjacent land surface, the opposite one of said straight sides diverging outwardly of said groove from the first mentioned side of said groove to provide a cutting edge with the adjacent land surface of reduced acuteness, the width of said grooves at the top being about twice the width of said ribs.

11. A gear cutting tool in the form of a gearlike member having helical teeth conjugate at crossed axes to the teeth of a gear to be cut, the teeth of said tool having grooves extending generally up and down the faces of said teeth, said grooves providing intermediate ribs, said ribs having top land surfaces which are conjugate to the teeth of the gear to be cut and which serve as guiding surfaces, said grooves having a cross section perpendicular to their length in which straight sides intersect the faces of the teeth to provide cutting edges at the corners of said ribs, one of said straight sides of said grooves being substantially parallel to the side of said tool and forming an obtuse angled cutting edge with the adjacent land surface, the opposite one of said straight sides diverging outwardly of said groove from the first mentioned side of said groove to provide a cutting edge with the adjacent land surface of reduced acuteness, said grooves having concave bottoms to reinforce said ribs against side thrust while providing increased effective depth.

12. A gear cutting tool in the form of a gearlike member having helical teeth conjugate at crossed axes to the teeth of a gear to be cut, the teeth of said tool having grooves extending generally up and down the faces of said teeth, said grooves providing intermediate ribs, said ribs having top land surfaces which are conjugate to the teeth of the gear to be cut and which serve as guiding surfaces, at least the portions of the side walls of said grooves which intersect the faces of the teeth to provide cutting edges being straight in cross section perpendicular to their length, one of the said straight side wall portions being substantially parallel to the side of said tool and forming an obtuse angle cutting edge with the adjacent land surface, the opposite one of said straight side wall portions diverging outwardly of said grooves from the first mentioned side wall portion to provide a cutting edge with the adjacent land surface of reduced acuteness.

WALTER S. PRAEG.